United States Patent [19]

Hake

[11] Patent Number: 5,249,411
[45] Date of Patent: Oct. 5, 1993

[54] SINGLE DRIVE BELT MOWER WITH FLEXIBLE HOUSING

[75] Inventor: Kenneth A. Hake, Tipton, Kans.

[73] Assignee: Kent Manufacturing, Inc., Tipton, Kans.

[21] Appl. No.: 979,903

[22] Filed: Nov. 23, 1992

[51] Int. Cl.⁵ .......................................... A01D 35/00
[52] U.S. Cl. .................................... 56/11.6; 56/13.5
[58] Field of Search .................... 56/10.1, 10.8, 11.1, 56/11.4, 11.6, 13.5-13.9

[56] References Cited

U.S. PATENT DOCUMENTS 2,743,567  5/1956  Martin .
3,152,431  10/1964  Ott et al. .
3,339,353  9/1967  Schreyer .
3,916,606  11/1975  Brudnak, Jr. et al. .
4,068,452  1/1978  Schaefer et al. .................... 56/11.6
4,231,215  11/1980  Klas .................................... 56/11.6
4,497,160  2/1985  Mullet et al. .
4,901,507  2/1990  Cracraft .

*Primary Examiner*—Thuy M. Bui
*Attorney, Agent, or Firm*—Litman, McMahon & Brown

[57] ABSTRACT

A mower apparatus includes multiple mowing sections each having a separate mower and each being interconnected with adjacent sections by hinge mechanisms. The mower sections are driven by a motor through a single endless belt reeved to be driven by the motor and to drive each of the mowers of the sections. The belt is configured in a unique manner such that as the belt crosses between adjacent hinged sections, the belt is run substantially parallel and in close proximity to the pivot axes of the hinge such that when the sections are pivoted relative to one another the belt does not substantially slacken or tighten.

10 Claims, 1 Drawing Sheet

SINGLE DRIVE BELT MOWER WITH FLEXIBLE HOUSING

BACKGROUND OF THE INVENTION

The present invention is directed to a mower assembly having a flexible, multiple section housing and especially to a mower assembly having a single drive belt configured to maintain the drive belt in a taut state as the mower housing flexes.

Mowers having multiple mowing units that are positioned adjacent to one another in a flexible housing provide substantial benefits to the user and have existed in one form or another for some time. Such mowers allow the multiple mower blades to be positioned in a side-by-side manner such that the mower is able to cut a comparatively wide swath with each pass thereof. The flexibility of the housing allows different portions of the housing and, therefore, different mower sections to follow the contour of the land and thereby provide a more even cut for the grass in uneven terrain than is provided by a single inflexible mower of the same width.

While mowers of this type have previously existed, certain problems associated with them have been unresolved in the past. One of those problems has to do with the drive of the various mower sections. Since it would be inconvenient and expensive to provide a motor for each of the mower drive sections, the various sections are powered from a single motor mechanism. The problem associated with this has been that most drive mechanisms that can be utilized for multiple mowers are fairly expensive in cost. For example, a gear arrangement can be provided at the outlet of the motor with a shaft connected to each of the mower sections to drive the mower sections; but for relatively small mowers this is again prohibitively expensive. Likewise, hydraulic units can be utilized to drive each of the individual mower sections; but for a comparatively small mower, hydraulics is a fairly expensive option. Whereas hydraulics and mechanical drive shafts are relatively expensive, a drive belt is a fairly inexpensive means of driving various mower sections.

While drive belts have been previously recognized for driving multiple sections, major problems have been encountered which severely limited their use. In particular, a drive belt does not remain taut and, therefore, loses some of its driving ability upon flexure of the various portions of the mower housing. That is, when two of the sections flex relative to one another, the drive belt may become so relaxed that it slips and does not effectively drive the mower sections. At other times if the mower sections pivot in such a manner as to significantly increase the tension on the drive belt, the belt may not be able to tolerate the increased tension and become overly worn or break.

Therefore, it is desirable to provide a flexible mower housing having multiple mower sections wherein the mower sections are driven by a single, relatively inexpensive drive belt, yet wherein this drive belt is maintained in relatively constant tension, even as the various sections of the mower housing pivot relative to one another.

SUMMARY OF THE INVENTION

A mower is provided having a plurality of mower sections, each of which is contained within a mower housing. The mower housing is hinged or otherwise articulated between at least two of the sections to allow pivotal movement of adjacent mower sections relative to one another. A motor mechanism is provided for rotating the mower blades associated with each of the mower sections.

The mower includes a drive means or an elongated drive belt which commonly rotates at least two of the mower sections relative to one another. Preferably the drive belt is an endless belt that is reeved to rotate all of the mower blades associated with the mower while in turn being rotated by the motor mechanism.

The belt is configured in such a manner as to advantageously maintain a generally constant tension or tautness therein even as the various mower sections follow varying terrain, which causes the mower sections to pivot relative to the other mower sections. In particular, the belt is reeved about a motor pulley and a set of pulleys to each of which is attached a mower blade. The belt is also reeved around a series of idler pulleys. Two of the idler pulleys are positioned on opposite sides and in a spaced relationship along a juncture of two of the mower sections. The belt has a transfer run wherein it passes substantially close to and parallel to the axis about which two of the sections pivot relative to one another. This run of the belt is merely twisted such that the belt is not significantly loosened or tightened as the adjacent sections pivot relative to one another.

The mower is provided with a series of selectively adjustable height setting devices which allow the operator to preselect the height that the mower sections will be maintained above the ground over which the mower passes.

The mower is also provided with a set of tension mechanisms which operate upon at least one of the idler pulleys to provide a generally even tension about the belt to adjust for differences in length of the belt due to aging, stretching, or the like and to further enhance the maintenance of relative constant tension in the transfer runs as the mower sections pivot.

OBJECTS AND ADVANTAGES OF THE INVENTION

Therefore, the objects of the present invention are: to provide a mower having a flexible housing with multiple mower sections which allows each of the mower sections to independently follow the contour of the land over which the mower is traversing; to provide such a mower wherein the blades of various mower sections are driven by a common drive belt which is also reeved to be driven by a single motor unit; to provide such a mower mechanism wherein transfer runs of the drive belt are configured to run generally parallel to pivot axes between adjacent mower sections as the drive belt passes from one mower section to another, to maintain approximately the same amount of tension upon the belt even as one section rotates either up or down relative to another section; to provide resiliently mounted pulleys and one end respectively of the transfer runs of the belt which further accommodate the flexure of the mower section; and to provide such a mower which is relatively easy to assemble, economical to produce, and especially well suited for the intended purpose thereof.

Other objects and advantages of this invention will become apparent from the following description taken in conjunction with the accompanying drawings wherein are set forth, by way of illustration and example, certain embodiments of this invention.

DETAILED DESCRIPTION OF THE INVENTION

Figure 1:
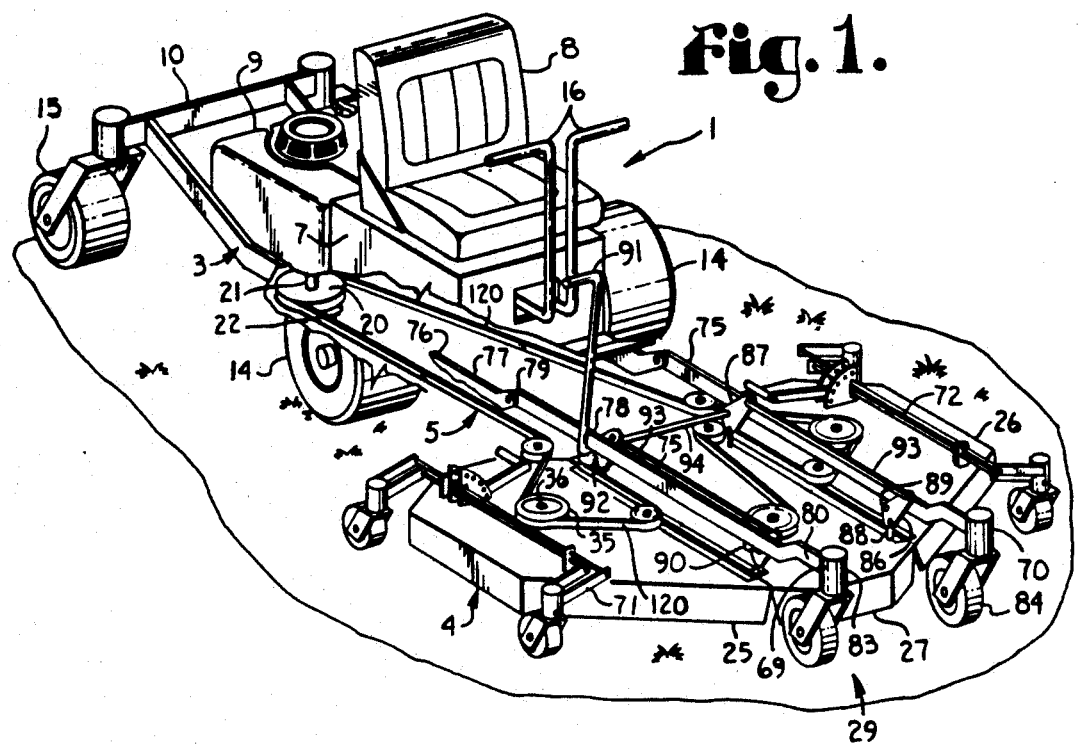
FIG. 1 is a perspective view of a flexible housing mower apparatus having a single drive belt arrangement which embodies the present invention, with portions broken away to clarify the illustration.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally represents a mower apparatus in accordance with the present invention. The mower apparatus 1 includes a motorized and wheeled vehicle 3, a mower housing 4, and drive means or assembly 5.

The illustrated vehicle 3 includes a vehicle body 7 having a seat 8 positioned thereon and a gasoline powered motor 9 mounted thereon. The vehicle 3 includes a frame 10 extending rearwardly from the body 7. A pair of front drive wheels 14 are mounted on the vehicle body 7, and a pair of trailing wheels 15 are pivotally mounted to the rear of the frame 10. The vehicle 3 is mainly controlled through a pair of handles 16 which cooperate with the motor 9 to selectively drive the wheels 14 in a manner which is well known within the industry. The motor 9 includes a power takeoff 20 comprising a driven shaft 21 having a motor drive pulley 22 attached thereto. It is foreseen that the power takeoff 20 can also be controlled by means of a clutch, not shown.

The mower housing 4 includes three mower sections, side or wing section 25, side or wing section 26 and central section 27. The mower housing 4 includes support and positioning means or apparatus 29.

The side section 25 includes a housing shell 33 having a mower blade 34 journaled on an underside thereof and rotatably driven by a pulley 35 acting through a shaft 36. A front pulley 38 and a rear pulley 39 are rotatably mounted on an upper side of the side section 25 and configured to rotate in the same general plane as the pulley 35. The pulleys 38 and 39 function as idler pulleys. The side section 26 is basically a mirror image of the section 25 and includes a housing shell 43 supporting a mower blade 44 which is journaled on the shell 43 and rotatably driven by a pulley 45 through a shaft 46. The blade 44 rotates below the shell 43, and the pulley 45 is positioned above the shell 43. Front and rear idler pulleys 48 and 49 are rotatably mounted on the upper side of the shell 43.

The central section 27 includes a housing shell 5 having mounted on opposite sides near the rear thereof two idler pulleys 57 and 58 which are freely rotatable relative to the shell 51. The pulleys 57 and 58 are tension pulleys and are mounted by shafts or bolts 59 and 60 which are slidable within slots 61 and 62 respectively in the shell 51. The tension pulleys 57 and 58 are urged by biasing means, such as springs 64 shown in slots 62 toward the rear of the shell 51 to maintain a generally constant tension upon the drive assembly 5, as will be discussed below.

Figure 2:
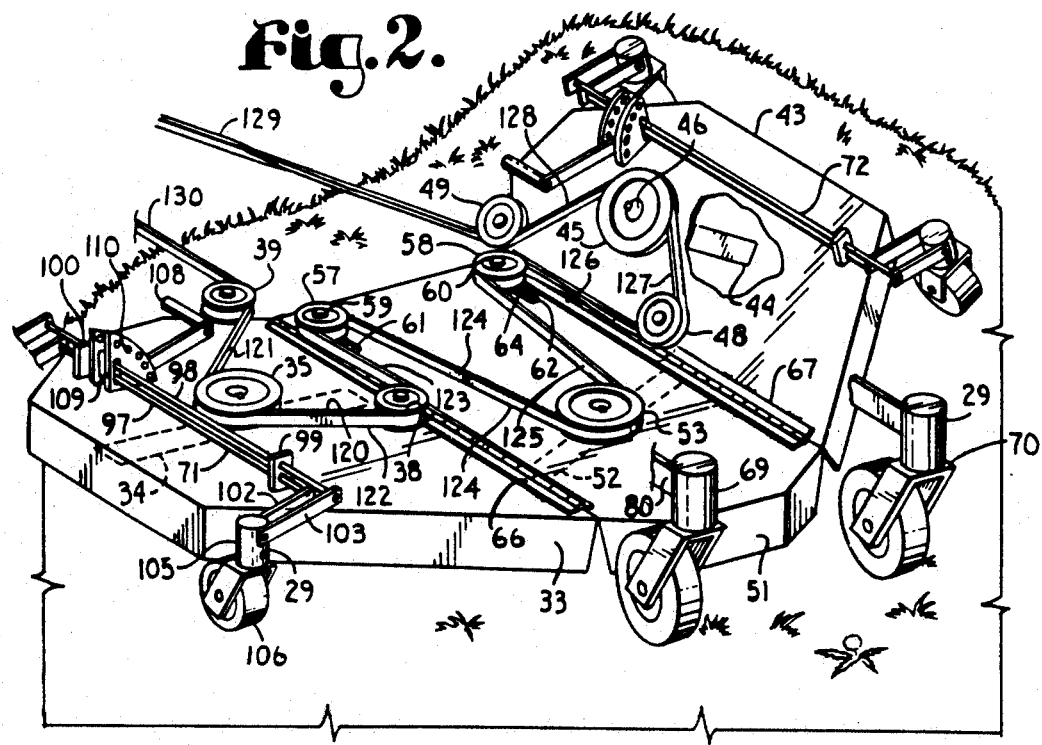
FIG. 2 is a fragmentary perspective view of the mower apparatus showing the housing and the configuration of the drive belt with the mower section on the right side in a raised position and with portions broken away to show greater detail thereof.

The central shell 51 has the outer shells 33 and 43 pivotably connected thereto by axially aligned hinge sets 66 between the outer shell 33 and the central shell 51 and axially aligned hinge sets 67 between the outer shell 43 and the central shell 51 to allow pivoting of the outer shells 33 and 43 relative to the central shell 51 along axes that are generally aligned with the direction of travel of the mower apparatus 1. While FIG. 2 illustrates the capability of the outer shells 33 and 43 to pivot upward relative to the central shell 51, the apparatus also has the capability of the outer shells 33 and 43 to pivot downward relative to the central shell 51. The support and positioning apparatus 29 provides support to the mower housing 4 to roll along the ground being traversed by the mower apparatus 1 at a cutting height selected by the operator. The support and positioning apparatus 29 includes a pair of central wheel assemblies 69 and 70 which support and position the central shell 51 and a pair of outrigger wheel assemblies 71 and 72 which support and position the laterally outward sides of the side shells 33 and 43 respectively.

Each of the central wheel assemblies 69 and 70 includes an elongated rod assembly 75 having a first end connected to the vehicle 3 along a first section 77. The section 77 is connected to a second section 78 at a pivot 79 that allows pivoting of the section 77 and 78 about a horizontal axis that extends laterally with respect to the direction of motion of the mower apparatus 1. A second end 80 of each rod assembly 75 is joined to a pivotal wheel housing or caster 83 having a ground engaging wheel 84 mounted therein. Each rod assembly 75 is joined at two locations therealong by a front bell crank 86 and a rear bell crank 87 to the central shell 51 by a pivotal link 88. Each of the front bell cranks 86 is connected to a respective rod 75 by a pivot pin 89 mounted on the underside of a respective rod 75, as by a bracket 90. Each of the rear bell cranks 87 is fixedly joined to a crank handle 91 which is also mounted to the underside of each of the rods 75 by a bracket 92. Alternatively, as illustrated, the rear bell cranks 87 may be connected by a cross shaft 94 whereby the rear bell cranks 87 may be pivoted in unison by a single crank handle 91. The front and rear bell cranks 86 and 87 associated with each of the rods 75 are joined near the upper end thereof by a common linkage 93, thereby forming parallelogram linkages with the center shell 51.

The wheel assemblies 69 and 70 function such that the mower housing 4, as a whole, is able to pivot relative to the vehicle 3 about the pivots 79 to better follow the contour of the land being traversed by the mower apparatus 1. Additionally, the operator can selectively set the cutting height of the mower housing central shell 51 by operation of the crank handle 91 to pivot the front and rear bell cranks 86 and 87 to either raise or lower the central shell 51 as necessary. The crank handle 91 may incorporate frictional or detent means (not shown) to maintain the housing 4 at the heights set by the handle 91.

Each of the outrigger assemblies 71 and 72 include a pair of elongate shafts 97 and 98 vertically spaced relative to one another and held in a fixed spaced vertical position relative to one another by a pair of struts 99 and 100 through which the shafts 97 and 98 rotatably pass. A pair of parallel linkage arms 102 and 103 is attached to opposite ends of each of the shafts 97 and 98 respectively. Each of the linkage arms 102 and 103 is in turn pivotally connected to a wheel housing 105 pivotally supporting a wheel 106 such that a pair of wheels 106 supports opposite outside ends of the front and back of the shells 33 and 43. A crank 108 is fixedly attached to the shaft 97 and held by a pair of positioning or detent plates 109 having detent apertures 110 there through which are adapted to receive a mating portion of the crank 108 so that an operator can selectively move the crank 108 and lock it in position relative to the position in plates 109. In this manner an operator can selectively move the crank 108 to adjust the wheels 106 upward or downward relative to the associated shell 33 or 34 to position the mower cutting height associated therewith.

A belt 120 is successively reeved about pulleys 39, 35, 38, 57, 53, 58, 48, 45, 49 and drive pulley 22. The belt 120 includes rungs 121, 122, 123, 124, 125, 126, and 127, 128, 129, and 130 that pass between these respective pulleys in succession. The belt 120 is a single unitary endless V-belt of conventional construction utilized for transference of rotational energy between pulleys. The distinguishing feature between the belt of the present invention and a typical belt is in the length of the belt 120. In particular, the belt 120 is reeved between all of the pulleys noted above such that all rotate or are rotated by the belt simultaneously. The belt 120 in this manner powers all of the mower blade drive pulleys 35, 53, and 45 simultaneously through the drive pulley 22 which is in turn rotated by the motor 9. The belt 120 is relatively flexible with respect to twisting and the like but is relatively non-stretchable and maintains a substantially constant length during usage.

Of particular interest are run 123 which passes between pulleys 38 and 57 and run 126 which passes between pulleys 58 and 48. The transfer runs 123 and 126 are positioned so that they pass substantially close to and parallel to the pivot axes of the hinges 66 and 67 so that the runs 123 and 126 are substantially parallel to the pivot axes of the side sections 25 and 26 relative to the central section 27. Ideally, if it were possible for the transfer runs 123 and 126 to be colinear with axes of the hinges 66 and 67, the runs 123 and 126 would merely twist as the associated sections pivot. Since colinearity of the transfer runs and hinge axes is not practical, it is desirable to position the runs 123 and 126 as close as possible and parallel to the axes of the hinges 66 and 67 and to limit the range of pivoting. In this manner, as either side section 25 or 26 pivots relative to the central section 27, the belt 120 is not required to substantially elongate or compress, even though the belt extends between these sections because of the fact that the belt runs parallel and close to the axis of rotation between the sections.

The belt runs 123 and 126 twist as the outer sections 25 and 26 pivot relative to the center section 27. Twisting of the belt runs 123 and 126 increases the tension therein. However, such increased tension can be compensated for by positioning of the pulley sets 38/57 and 48/58 so that the distance between the pulleys of each set decreases as the associated outer section pivots up.

The spring loaded pulleys 57 and 58 are positioned to maintain a generally constant tension in the belt 120 but would not be able to handle a great deal of slack or tension should the belt have to continuously vary in this regard relative to pivotal movement of the side sections 25 and 26 relative to the central section 27. Therefore, the belt 120 is able to simultaneously run or operate mower blades in adjacent sections such as section 25 relative to 27 or section 26 relative to 27 even though these sections are pivoting relative to one another without the belt becoming overly slack at certain times and overly stretched or tensioned at other times.

It is to be understood that while certain forms of the present invention have been illustrated and described herein, it is not to be limited to the specific forms or arrangement of parts described and shown.

What is claimed and desired to be secured by Letters Patent is as follows:

1. In a mowing apparatus having at least a first mower section and a second mower section pivotally connected to one another and a motor means for driving both of said mower sections, the improvement comprising:
   a) an endless drive belt drivingly engaging said motor means with said mower sections to drive same;
   b) said mower sections being joined by hinge means having a hinge axis thereby enabling said mowers to pivot relative to one another; and
   c) pulley means positioning a transfer run of said belt substantially parallel to and in such close proximity to said hinge axis that a relatively constant tension is maintained in said belt when said mower sections pivot relative to one another.

2. A mower apparatus as set forth in claim 1 wherein:
   a) said apparatus includes three separate mower sections including a third section hingedly connected to said second section to enable relative pivoting of said second and third sections about a second hinge axis, each of said mower sections including a pulley driven mower blade motivated by said belt;
   b) said transfer run being a first transfer run between said first and second sections; and
   (c) second pulley means forming a second transfer run in said belt between said second and third sections which is positioned substantially parallel to and in such close proximity to said second hinge axis that said relatively constant tension is maintained in said belt when said second and third sections pivot relative to one another.

3. A mower apparatus as set forth in claim 1 wherein said pulley means includes:
   (a) a tension pulley is resiliently mounted on one of said mower sections, has said belt reeved thereabout, and cooperates with said transfer run of said belt to enhance the maintenance of said relatively constant tension in said belt.

4. A mowing apparatus comprising:
   (a) a first mower section including a mower blade journaled on a first housing;
   (b) a second mower section including a second housing;
   (c) hinge means pivotally connecting said first and second housings to enable relative pivoting of said first and second sections about a hinge axis;
   (d) rotary motor means;
   (e) an endless belt drivingly engaged between said motor means and said mower blade to rotate said blade by operation of said motor means;

(f) a first pulley journaled on said first housing and a second pulley journaled on said second housing, said pulleys having said belt reeved thereabout and cooperating to transfer drive from one of said sections to the other; and (g) said first and second pulleys being positioned with respect to said hinge axis to define a transfer run of said belt between said pulleys which is oriented substantially parallel to and in such proximity to said hinge axis that a relatively constant tension is maintained said belt during said relative pivoting of said mower sections.

5. An apparatus as set forth in claim 4 wherein:
(a) one of said pulleys is resiliently mounted on a respective housing to enhance the maintenance of said relatively constant tension in said belt during said relative pivoting of said mower sections.

6. An apparatus as set forth in claim 4 and including:
(a) a third mower section including a third housing;
(b) second hinge means pivotally connecting said third housing to said second housing to enable relative pivoting of said second and third housings about a second hinge axis;
(c) a third pulley journaled on said third housing and a fourth pulley journaled on said second housing, said third and fourth pulleys having said belt reeved thereabout and cooperating to transfer drive from one of said second and third sections to the other; and
(d) said third and second pulleys being positioned with respect to said second hinge axis to define a second transfer run of said belt between said third and fourth pulleys which is oriented substantially parallel to and in such close proximity to said second hinge axis that said relatively constant tension is maintained in said belt during said relative pivoting of said second and third mower sections.

7. An apparatus as set forth in claim 6 wherein:
(a) one of said third and fourth pulleys is resiliently mounted on a respective housing to enhance the maintenance of said relatively constant tension in said belt during said relative pivoting of said second and third mower sections.

8. An apparatus as set forth in claim 6 wherein:
(a) each of said mower sections has a respective mower blade journaled thereon; and
(b) said belt is drivingly engaged with each mower blade and provides rotation thereto.

9. A mowing apparatus comprising:
(a) a center mower section including a center mower blade journaled on a center housing and having opposite sides;
(b) a pair of wing mower sections, each including a wing mower blade journaled on a wing housing;
(c) respective hinge means pivotally connecting said wing housings to said center housing on said opposite sides of said center section to enable pivoting of said wing sections relative to said center section about respective hinge axes;
(d) rotary motor means;
(e) an endless belt drivingly engaged among said motor means and the mower blade of each of said mower sections to rotate said blades by operation of said motor means;
(f) a pair of transfer pulleys associated with each hinge axis and including a wing section pulley journaled on a respective wing housing and a center section pulley journaled on said center housing, said pulleys having said belt reeved thereabout and cooperating to transfer drive from one of the respective wing section and said center section to the other; and
(g) each pair of pulleys being positioned in relation to its associated hinge axis to define a respective transfer run of said belt between said pulleys which is oriented substantially parallel to and in such proximity to the associated hinge axis that a relatively constant tension is maintained in said belt during pivoting of the respective wing section relative to said center section.

10. An apparatus as set forth in claim 9 and including:
(a) height adjustment means mounted on at least one of said housings and operable to selectively adjust a height of said blades above a ground surface over which said apparatus is operated.

* * * * *